United States Patent
Kim et al.

(10) Patent No.: US 12,276,811 B2
(45) Date of Patent: *Apr. 15, 2025

(54) SENSOR SHIFTING ACTUATOR AND CAMERA MODULE INCLUDING SENSOR SHIFTING ACTUATOR

(71) Applicant: Samsung Electro-Mechanics Co., Ltd., Suwon-si (KR)

(72) Inventors: Ju Ho Kim, Suwon-si (KR); Jung Hyun Park, Suwon-si (KR); Dong Hoon Lee, Suwon-si (KR); Sang Hyun Ji, Suwon-si (KR); Do Hwan Kim, Suwon-si (KR); Nam Keun Oh, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 210 days.

This patent is subject to a terminal disclaimer.

(21) Appl. No.: 18/096,692

(22) Filed: Jan. 13, 2023

(65) Prior Publication Data

US 2023/0221574 A1 Jul. 13, 2023

(30) Foreign Application Priority Data

Jan. 13, 2022 (KR) ........................ 10-2022-0005252

(51) Int. Cl.
*G02B 27/64* (2006.01)
*H04N 23/68* (2023.01)

(52) U.S. Cl.
CPC ....... *G02B 27/646* (2013.01); *H04N 23/6812* (2023.01); *H04N 23/687* (2023.01)

(58) Field of Classification Search
None
See application file for complete search history.

(56) References Cited

U.S. PATENT DOCUMENTS

| 2017/0155816 A1 | 6/2017 | Ito et al. |
| 2020/0314338 A1 | 10/2020 | Johnson et al. |

(Continued)

FOREIGN PATENT DOCUMENTS

| JP | 2012-103376 A | 5/2012 |
| JP | 2017-107190 A | 6/2017 |

(Continued)

OTHER PUBLICATIONS

Korean Office Action issued on Jun. 26, 2023, in counterpart Korean Patent Application No. 10-2022-0005252 (7 pages in English, 5 pages in Korean).

*Primary Examiner* — Rodney E Fuller
(74) *Attorney, Agent, or Firm* — NSIP Law

(57) ABSTRACT

A sensor shifting actuator includes a fixed body; a moving body disposed in the fixed body and including an image sensor having an imaging surface; a supporting substrate disposed in the fixed body and configured to support the moving body so that the moving body is movable with respect to the fixed body in first and second directions parallel to the imaging surface of the image sensor; and a driver configured to move the moving body in either one or both of the first and second directions. The supporting substrate includes a movable portion coupled to the moving body, a fixed portion coupled to the fixed body, and a connection portion disposed between the movable portion and the fixed portion. The movable portion and the connection portion are movable together in the first direction, and the movable portion is movable with respect to the connection portion in the second direction.

23 Claims, 17 Drawing Sheets

(56) References Cited

U.S. PATENT DOCUMENTS

| | | | |
|---|---|---|---|
| 2022/0086317 A1 | 3/2022 | Paik et al. | |
| 2022/0094853 A1* | 3/2022 | Xu ........................ | H04N 23/55 |
| 2022/0247931 A1* | 8/2022 | Mahmoudzadeh ........................ | |
| | | | H02K 41/0356 |
| 2023/0209198 A1* | 6/2023 | Lee ...................... | H04N 23/687 |
| | | | 348/208.11 |

FOREIGN PATENT DOCUMENTS

| | | |
|---|---|---|
| KR | 10-2019-0054550 A | 5/2019 |
| KR | 10-2019-0072690 A | 6/2019 |
| KR | 10-2020-0005436 A | 1/2020 |
| KR | 10-2020-0086077 A | 7/2020 |
| WO | WO 2017/037688 A1 | 3/2017 |

\* cited by examiner

SENSOR SHIFTING ACTUATOR AND CAMERA MODULE INCLUDING SENSOR SHIFTING ACTUATOR

CROSS-REFERENCE TO RELATED APPLICATIONS

This application claims the benefit under 35 USC 119(a) of Korean Patent Application No. 10-2022-0005252 filed on Jan. 13, 2022, in the Korean Intellectual Property Office, the entire disclosure of which is incorporated by reference for app purposes.

BACKGROUND

1. Field

The present disclosure relates to a sensor shifting actuator and a camera module including a sensor shifting actuator.

2. Field

A camera module has become a standard feature in mobile communication terminals such as smartphones, tablet PCs, and notebook computers.

Such a camera module is typically provided with an actuator having a focus adjustment function and a shake correction function to capture a high-resolution image.

For example, a focus is adjusted by moving a lens module in an optical axis (Z-axis) direction, and shaking is corrected by moving the lens module in a direction orthogonal to the optical axis (Z-axis).

However, as improvements have been made in the performance of the camera module, the weight of the lens module has been increasing. Further, the weight of a driver for moving the lens module may make it difficult to precisely control the driving force for shake correction.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a sensor shifting actuator includes a fixed body; a moving body disposed in the fixed body and including an image sensor having an imaging surface, and a sensor substrate on which the image sensor is disposed; a supporting substrate disposed in the fixed body and configured to support the moving body so that the moving body is movable with respect to the fixed body in a first direction and a second direction both parallel to the imaging surface of the image sensor; and a driver configured to move the moving body in either one or both of the first direction and the second direction, wherein the supporting substrate includes a movable portion coupled to the moving body, a fixed portion coupled to the fixed body, and a connection portion disposed between the movable portion and the fixed portion, the movable portion and the connection portion are configured to be movable together in the first direction, and the movable portion is configured to be movable with respect to the connection portion in the second direction.

The supporting substrate may further include a first bridge connecting the fixed portion and the connection portion to each other in the second direction, and a second bridge connecting the movable portion and the connection portion to each other in the first direction, and the first direction and the second direction may be orthogonal to each other.

The first bridge and the second bridge may each include a plurality of bridge elements, and each bridge element of the bridge elements may have a length in a connection direction of the bridge element.

Each bridge element of the bridge elements may have a width and a height, the width may be less than the height, and the width of each bridge element may be a width in a direction orthogonal to a length direction of the bridge element in a plane parallel to the imaging surface, and the height may be a height in a direction orthogonal to the imaging surface.

Each bridge element of the bridge elements may include a bridge part, and a trace part disposed at one end of the bridge part when viewing a cross-section of the bridge element in a length direction of the bridge element, and the trace part may be configured to transmit a signal of the image sensor outside the sensor shifting actuator.

The movable portion and the connection portion may be configured to be movable together with the moving body in the first direction in response to the moving body being moved in the first direction, and the movable portion may be configured to be movable together with the moving body in the second direction in response to the moving body being moved in the second direction.

The driver may include a magnet portion disposed on one of the moving body and the fixed body, and a coil portion disposed on a remaining one of the moving body and the fixed body, and the magnet portion and the coil portion may oppose each other in a direction orthogonal to the imaging surface.

The driver may further include a position sensor opposing the magnet portion.

The movable portion and the connection portion may be spaced apart from each other in a plane parallel to the imaging surface, the fixed portion and the connection portion may be spaced apart from each other in the plane parallel to the imaging surface, and the magnet portion and the coil portion may be disposed between the fixed portion and the connection portion when viewed in the direction orthogonal to the imaging surface.

In another general aspect, a camera module includes a lens module including at least one lens; a housing in which the lens module is disposed; a driver configured to move the lens module in an optical axis direction of the lens module; a fixed body coupled to the housing; a moving body disposed in the fixed body and including an image sensor; and a supporting substrate configured to support the moving body so that the moving body is movable with respect to the fixed body in a first direction and a second direction both orthogonal to the optical axis direction, wherein a first portion of the supporting substrate is configured to be movable together with the moving body in the first direction and the second direction, and a second portion of the supporting substrate is configured to be movable together with the first portion of the supporting substrate in the first direction or the second direction.

The supporting substrate may include a movable portion coupled to the moving body, a fixed portion coupled to the fixed body, and a connection portion disposed between the movable portion and the fixed portion, the movable portion may be the first portion of the supporting substrate, the connection portion may be the second portion of the supporting substrate, the movable portion and the connection portion may be configured to be movable together with the moving body in the first direction in response to the moving body being moved in the first direction, and the movable portion may be configured to be movable together with the moving body in the second direction in response to the moving body being moved in the second direction.

The supporting substrate may further include a first bridge connecting the fixed portion and the connection portion to each other in the second direction, and a second bridge connecting the movable portion and the connection portion to each other in the first direction, and the first bridge and the second bridge each may include at least one electrical trace configured to transmit a signal of the image sensor outside the sensor shifting actuator.

The first bridge and the second bridge may each include a plurality of bridge elements, each bridge element of the bridge elements may have a width, a height, and a length, the width may be less than the height, and the width of each bridge element may be a width in a direction orthogonal to a length direction of the bridge element in a plane orthogonal to the optical axis direction, and the height may be a height in the optical axis direction.

The camera module may further include a reflective module disposed in front of the lens module, wherein the reflective module may be configured to change a path of light incident on the reflective module so that the incident light is directed toward the lens module.

In another general aspect, a sensor shifting actuator includes a fixed body; a supporting substrate disposed in the fixed body; and a moving body disposed on the supporting substrate and including an image sensor having an imaging surface, wherein the supporting substrate includes a movable portion on which the moving body is disposed; a connection portion surrounding the movable portion and spaced apart from the movable portion on all sides of the movable portion when viewed in a direction orthogonal to the imaging surface; and a fixed portion surrounding the connection portion and spaced apart from the connection portion on all sides of the connection portion when viewed in the direction orthogonal to the imaging surface, the connection portion is configured to be movable together with the movable portion and the moving body with respect to the fixed portion in a first direction parallel to the imaging surface; and the movable portion is configured to be movable together with the moving body with respect to both the connection portion and the fixed portion in a second direction parallel to the imaging surface and orthogonal to the first direction.

The supporting substrate may further include two first bridges respectively connecting two opposite sides of the connection portion to the fixed portion in the second direction; and two second bridges respectively connecting two opposite sides of the movable portion to the connection portion in the first direction.

The two first bridges may be flexible in the first direction, and may not be flexible in the second direction, and the two second bridges may be flexible in the second direction, and may not be flexible in the first direction.

The movable portion, one of the two second bridge elements, the connection portion, one of the two first bridge elements, and the fixed portion may each include a respective portion of a continuous electrical trace configured to transmit a signal of the image sensor outside the sensor shifting actuator.

The sensor shifting actuator may further include a driver configured to move the moving body in the first direction and the second direction, and rotate the moving body about an optical axis of the imaging surface.

In another general aspect, a sensor shifting actuator includes a fixed body; a supporting substrate disposed in the fixed body; and a moving body disposed on the supporting substrate and including an image sensor having an imaging surface, wherein the supporting substrate includes a fixed portion fixed to the fixed body; a connection portion flexibly supported by the fixed body so that the connection portion is configured to be movable only in a first direction parallel to the imaging surface to perform shake correction; and a movable portion on which the moving body is disposed, the movable portion being flexibly supported by the connection portion so that the movable portion is configured to be movable together with the moving body and the connection portion in the first direction to perform the shake correction, and movable together with the moving body in a second direction parallel to the imaging surface and orthogonal to the first direction to perform the shake correction.

The supporting substate may further include two first bridges respectively connecting two opposite sides of the connection portion to the fixed portion in the second direction and being configured to bend only in the first direction; and two second bridges respectively connecting two opposite sides of the movable portion to the connection portion in the first direction and being configured to bend only in the second direction.

The sensor shifting actuator may further include a driver configured to move the moving body in the first direction and the second direction to perform the shake correction, wherein the driver may include a magnet portion and a coil portion facing the magnet portion in a direction orthogonal to the imaging surface, and either the magnet portion may be disposed on the fixed housing and the coil portion may be disposed on the moving body, or the magnet portion may be disposed on the moving body and the coil portion may be supported by the fixed housing.

The driver may be further configured to rotate the moving body about an optical axis of the image sensor to perform the shake correction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
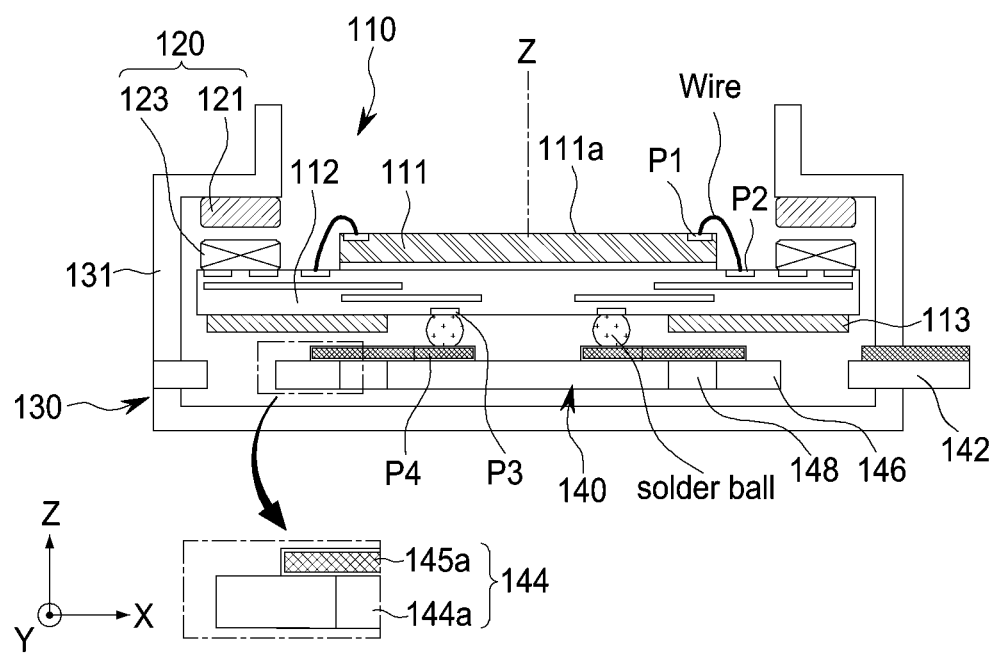
FIG. 1 is a schematic cross-sectional view of a sensor shifting actuator according to an example embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1 is a schematic cross-sectional view of a sensor shifting actuator according to an example embodiment of the present disclosure.

Figure 10:
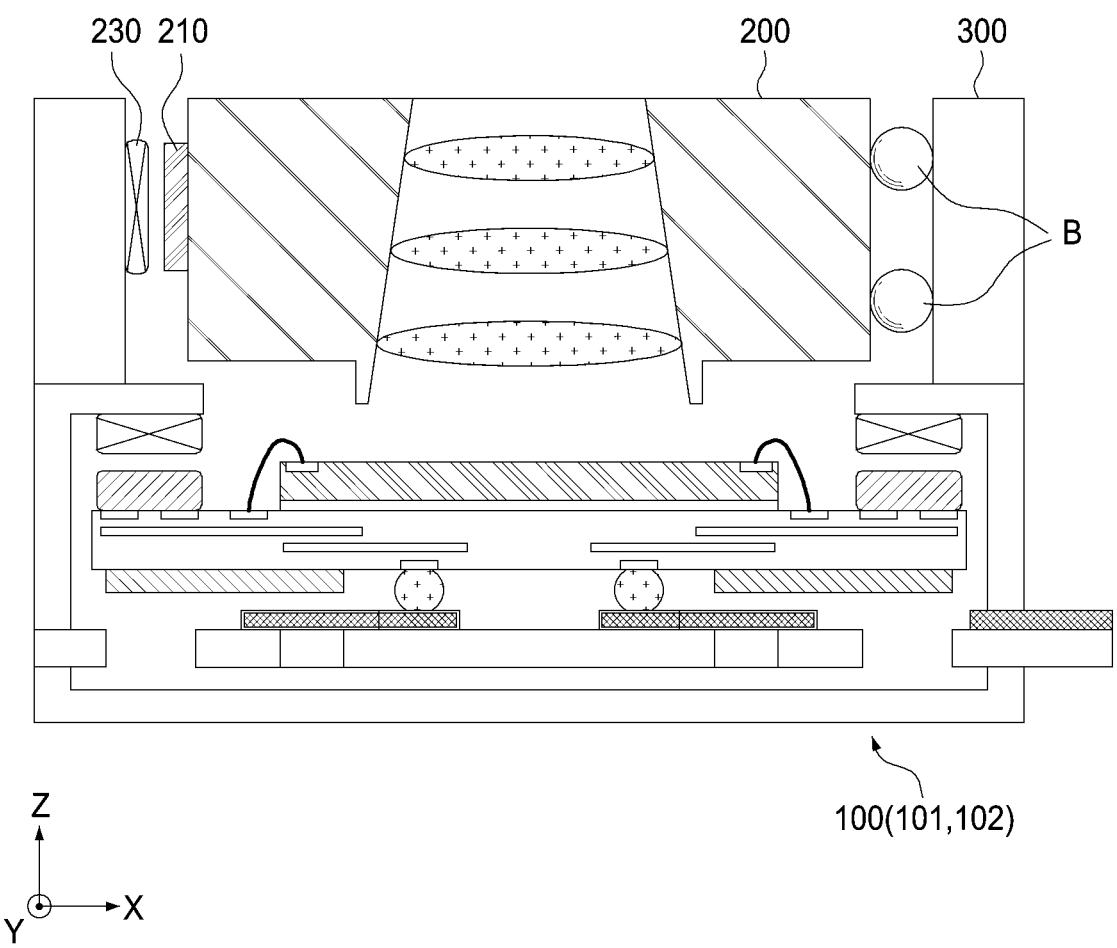
FIG. 10 is a schematic cross-sectional view of a camera module according to an example embodiment of the present disclosure.
Figure 11:
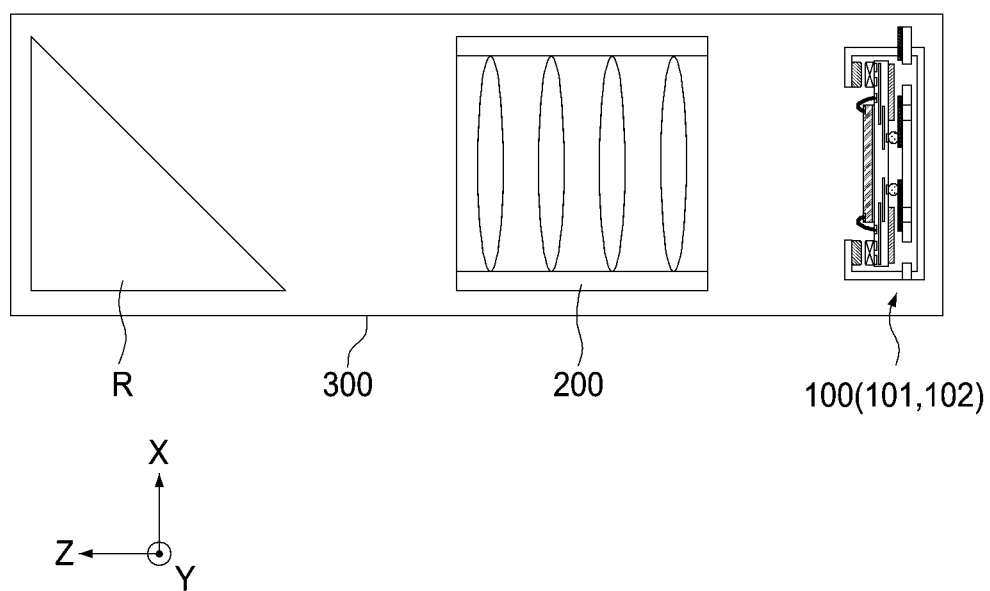
FIG. 11 is a schematic cross-sectional view of a camera module according to another example embodiment of the present disclosure.

Referring to FIG. 1, a sensor shifting actuator 100 according to an example embodiment of the present disclosure may be a component of camera modules 10 and 20 shown in FIGS. 10 and 11. The camera modules 10 and 20 may be mounted in a portable electronic device, such as a mobile communication terminal, a smartphone, or a tablet PC.

The sensor shifting actuator 100 may include a moving body 110, a fixed body 130, a supporting substrate 140, and a driver 120.

The moving body 110 may include an image sensor 111 and a sensor substrate 112. The moving body 110 may be configured to be movable with respect to the fixed body 130.

The image sensor 111 may be disposed on a surface of the sensor substrate 112, and a supporting substrate 140 supporting the sensor substrate 112 to be movable may be coupled to the other surface of the sensor substrate 112. At least a portion of the supporting substrate 140 may have a flexible form that is flexibly bent according to a movement of the sensor substrate 112.

A reinforcing plate 113 for reinforcing a rigidity of the sensor substrate 112 may be coupled to the other surface of the sensor substrate 112. Therefore, when the moving body 110 is moved, direct contact between the sensor substrate 112 and the supporting substrate 140 can be prevented.

In an example embodiment, a contact point P1 of the image sensor 111 and a contact point P2 of the sensor substrate 112 may be electrically connected to each other by wire bonding through a wire W.

A signal from the image sensor 111 may be transmitted to other electronic components through the sensor substrate 112 and the supporting substrate 140.

The fixed body 130 may include a housing 131 and components fixedly coupled to the housing 131. For example, the fixed body 130 may include a magnet portion 121 to be described below.

The driver 120 may move the moving body 110.

Through the driver 120, the moving body 110 may move in a direction orthogonal to a direction in which an imaging surface 111a of the image sensor 111 is facing. In an example embodiment, the driver 120 may correct shaking occurring during image capturing of a camera module in which the image sensor 111 is mounted.

The driver 120 may move the moving body 110 including the image sensor 111 in a first direction (X-direction) and a second direction (Y-direction) both orthogonal to an optical axis (Z-axis). The first direction (X-direction) and the second direction (Y-direction) may intersect each other. For example, the driver 120 may move the moving body 110 in the first direction (X-direction) and/or the second direction (Y-direction) orthogonal to the optical axis (Z-axis), and accordingly shaking may be corrected. In addition, the driver 120 may rotate the moving body 110 about the optical axis (Z-axis) as a rotation axis.

In the present specification, a direction in which the imaging surface 111a of the image sensor 111 faces may be referred to as an optical axis (Z-axis) direction. That is, the moving body 110 may move in a direction orthogonal to the optical axis (Z-axis) with respect to the fixed body 130.

In the drawings of the present specification, the moving body 110 moving in a direction parallel to the imaging surface 111a may be understood as the moving body 110 moving in the direction orthogonal to the optical axis (Z-axis).

The moving body 110 moving in the first direction (X-direction) may be understood as the moving body 110 moving in the direction orthogonal to the optical axis (Z-axis).

In addition, the first direction (X-direction) and the second direction (Y-direction) may be examples of two directions orthogonal to the optical axis (Z-axis) and intersecting each other. In the present specification, the first direction (X-direction) and the second direction (Y-direction) may be understood as two directions orthogonal to the optical axis (Z-axis) and intersecting each other.

Figure 2:
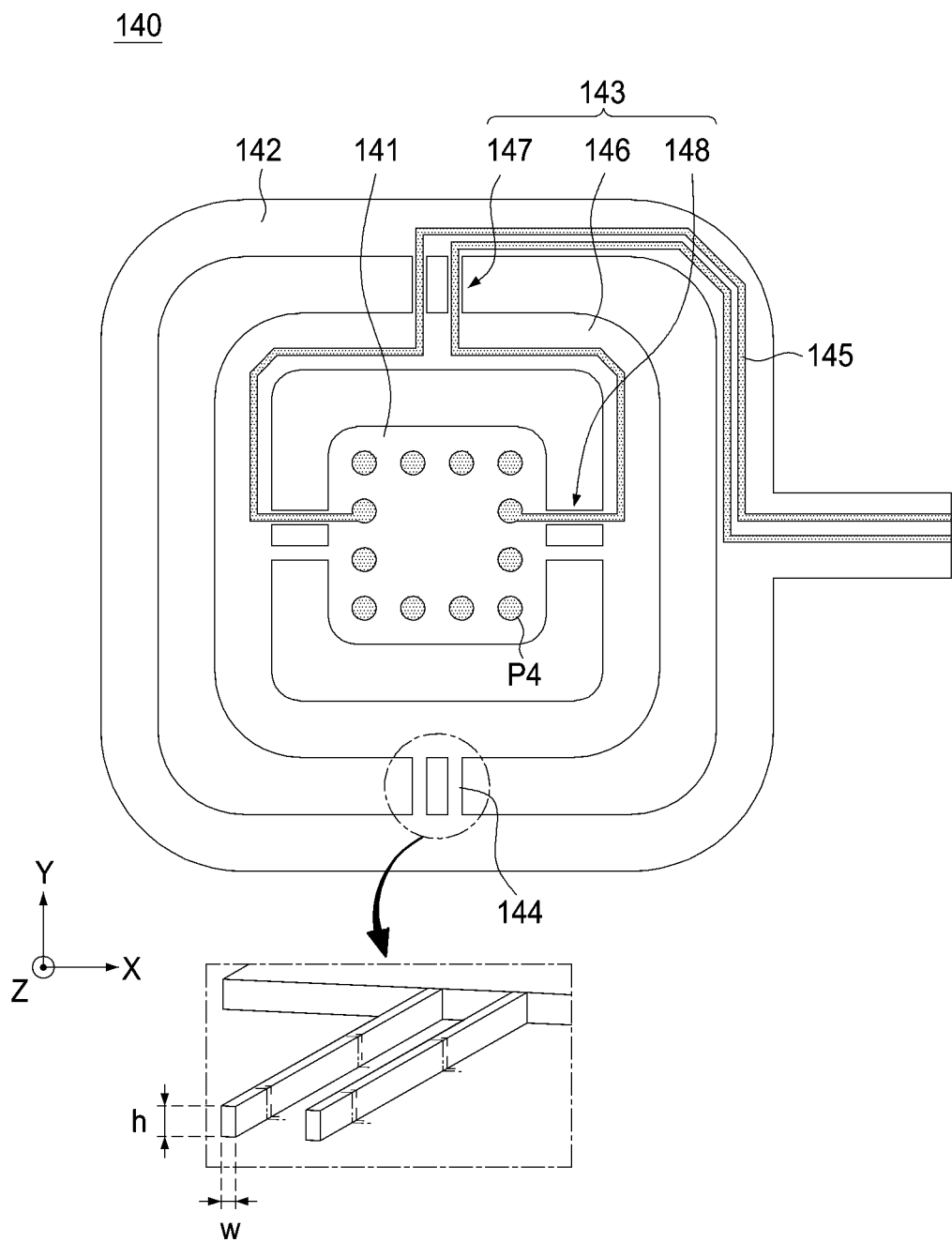
FIG. 2 is a plan view of a supporting substrate of FIG. 1 according to an example embodiment.

FIG. 2 is a plan view of a supporting substrate of FIG. 1 according to an example embodiment.

Referring to FIG. 2, the sensor shifting actuator 100 according to an example embodiment of the present disclosure may include the supporting substrate 140 supporting the moving body 110. The supporting substrate 140 may support the moving body 110 to be movable in a direction orthogonal to an optical axis (Z-axis) with respect to the fixed body 130.

A portion of the supporting substrate 140 may be deformed according to a movement of the moving body 110 with respect to the fixed body 130. That is, a portion of the supporting substrate 140 may be flexible. When the supporting substrate 140 is deformed, a restoring force may be generated in the supporting substrate 140, and this restoring force may enable the moving body 110 to return to an original position thereof. When a current is applied to a coil portion 123 to be described below, the moving body 110 in an equilibrium state may move with respect to the fixed body 130. When no current flows in the coil portion 123, the moving body 110 may be returned to an original position thereof by the restoring force of the supporting substrate 140.

Referring to FIGS. 1 and 2, the supporting substrate 140 may include a movable portion 141 on which the sensor substrate 112 is mounted, and a fixed portion 142 fixed to the fixed body 130. The sensor substrate 112 and the movable portion 141 may be electrically connected to each other through solder balls at contact points P3 on the sensor substrate 112 and contact points P4 on the movable portion 141.

When the moving body 110 moves with respect to the fixed body 130, the movable portion 141 may move with respect to the fixed portion 142. The supporting substrate 140 may include a supporting portion 143 connecting the movable portion 141 and the fixed portion 142 to each other. The supporting portion 143 may be at least partially deformed according to a relative movement between the movable portion 141 and the fixed portion 142. For example, the supporting portion 143 may be made of a flexible substrate. The flexible substrate may be provided in a form in which a conductive pattern, i.e., an electrical trace 145, is formed inside or on a film formed of a polyimide material.

In an example embodiment, the supporting substrate 140 may include a plurality of bridge elements 144 connecting the movable portion 141 and the fixed portion 142 to each other. The plurality of bridge elements 144 may be part of the supporting portion 143.

The plurality of bridge elements 144 may be made of a flexible material, and may be deformed when the movable portion 141 moves with respect to the fixed portion 142. When the moving body 110 moves with respect to the fixed body 130, the movable portion 141 may move with respect to the fixed portion 142. A restoring force generated when the bridge elements 144 are deformed may enable the moving body 110 and the movable portion 141 to return to original positions thereof.

The plurality of bridge elements 144 may include at least one electrical trace 145 embedded in them or disposed on them. That is, the plurality of bridge elements 144 may electrically connect the movable portion 141 (or the moving body 110) to the fixed portion 142 (or the fixed body 130) to each other while mechanically connecting the movable portion 141 (or the moving body 110) to the fixed portion 142 (or the fixed body 130) to each other.

Accordingly, the bridge elements 144 may function as a path for transmitting signals of the image sensor 111 while supporting the image sensor 111.

Referring to FIG. 1, the plurality of bridge elements 144 may each include a bridge part 144a and a trace part 145a. In one example embodiment, the trace part 145a may be disposed at one end of a cross-section of the bridge part 144a. In another example embodiment, the trace part 145a may be disposed at opposite ends of the cross-section of the bridge part 144a.

The bridge part 144a may mechanically connect the movable portion 141 (or the moving body 110) to the fixed portion 142 (or the fixed body 130), and the trace part 145a may electrically connect the movable portion 141 (or the moving body 110) to the fixed portion 142 (or the fixed body 130).

The plurality of bridge elements 144 may be formed by an etching process. Accordingly, cross-sections of the bridge parts 144a of the plurality of bridge elements 144 may include curved surfaces.

In an example embodiment, the supporting substrate 140 may include a connection portion 146 disposed between the movable portion 141 and the fixed portion 142. For example, the connection portion 146 may be provided in the form of a square frame surrounding the movable portion 141.

The connection portion 146 may be configured to surround the movable portion 141, and the fixed portion 142 may be configured to surround the connection portion 146.

A space may be formed between the movable portion 141 and the connection portion 146 to accommodate a movement range of the movable portion 141 with respect to the connection portion 146. In addition, a space may be formed between the connection portion 146 and the fixed portion 142 to accommodate a movement range of the connection portion 146 with respect to the fixed portion 142.

The fixed portion 142, the connection portion 146, and the movable portion 141 may be connected through the bridge elements 144. For example, the supporting substrate 140 may include first bridges 147 connecting the fixed portion 142 and the connection portion 146 to each other, and second bridges 148 connecting the movable portion 141 and the connection portion 146 to each other.

The first bridges 147 and the second bridges 148 may extend in a direction orthogonal to the optical axis (Z-axis). The first bridges 147 and the second bridges 148 may extend in directions intersecting each other. For example, the first bridges 147 may extend in a Y-direction, and the second bridges 148 may extend in an X-direction.

The first bridges 147 and the second bridges 148 may each include one or more bridge elements 144. In FIG. 2, the first bridges 147 each include two bridge elements 144 extending in the Y-direction, and the second bridges 148 each include two bridge elements 144 extending in the X-direction. However, the present disclosure is not limited to any specific number of the bridge elements 144.

The form of the supporting substrate 140 of FIG. 2 is merely an example, and the supporting portion 143 connecting the movable portion 141 and the fixed portion 142 to each other may have various forms.

Figure 4:
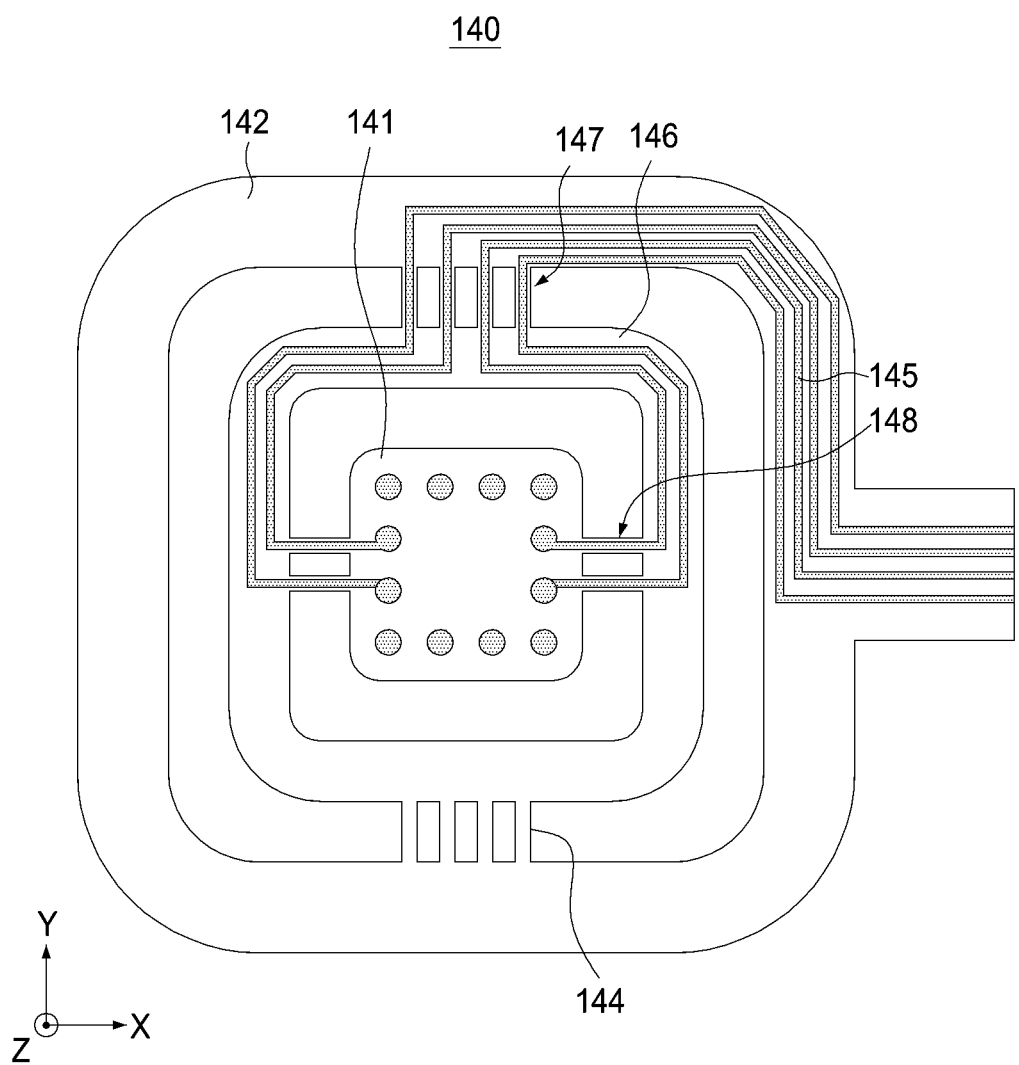
FIGS. 4 to 6 illustrate modifications of the supporting substrate of FIG. 2.
Figure 5:
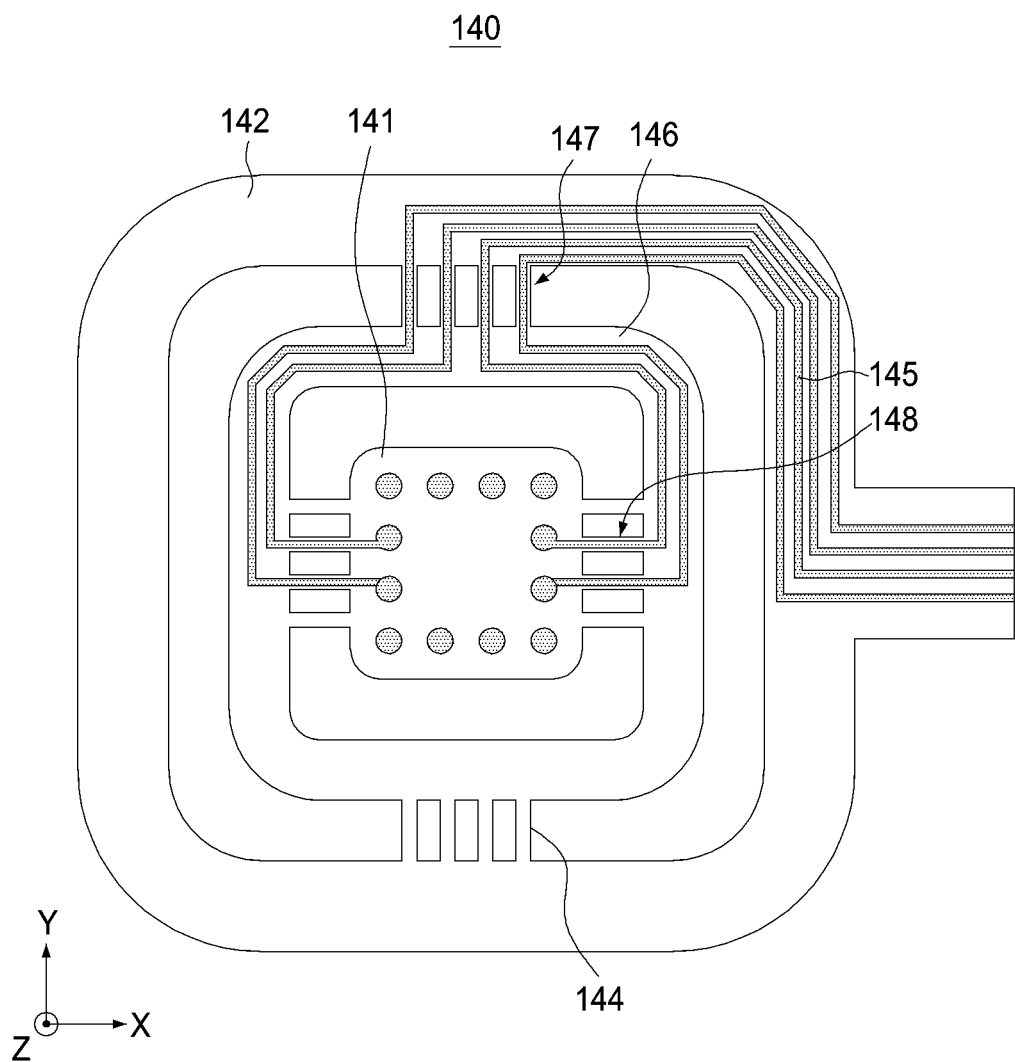
Figure 6:
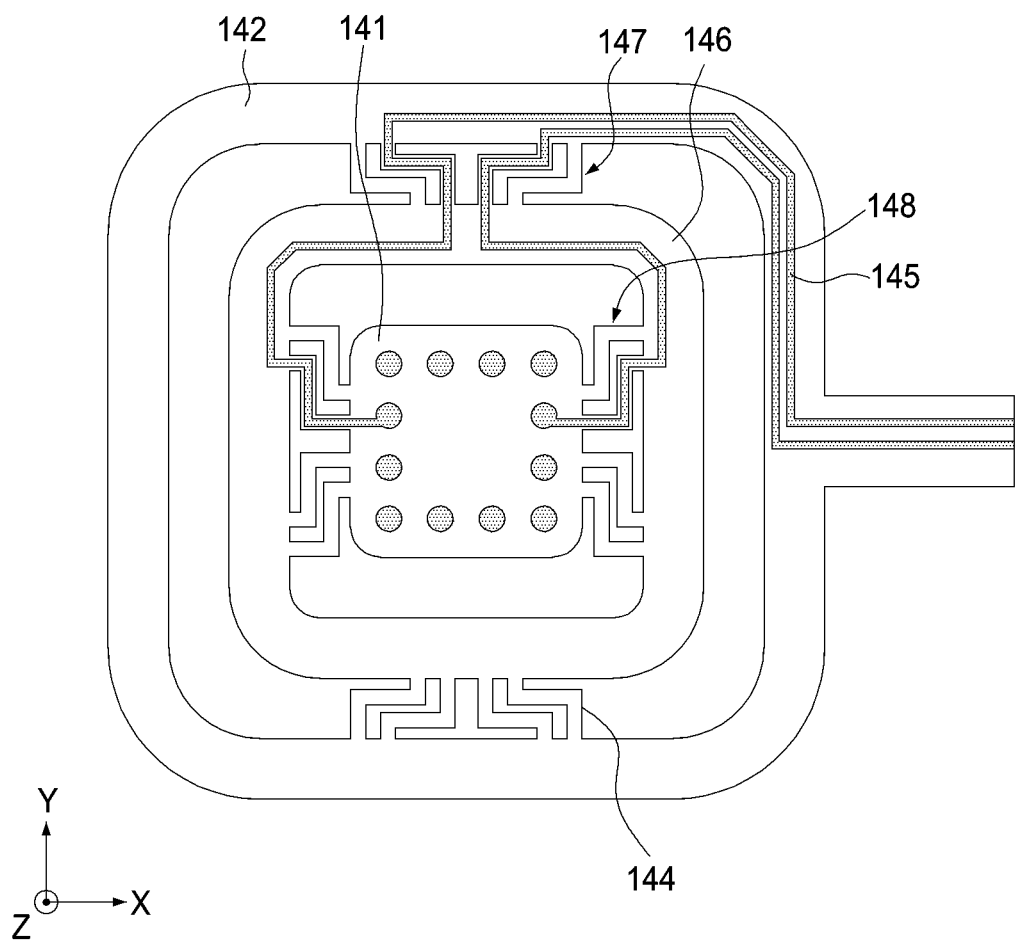

FIGS. 4 to 6 illustrate modifications of the supporting substrate of FIG. 2.

For example, the first bridges 147 and the second bridges 148 may have a form according to the modifications illustrated in FIGS. 4 to 6.

For example, it is possible to change the number of bridge elements 144 in either one or both of the first bridges 147 and the second bridges 148 as illustrated in FIGS. 4 and 5, and to form the bridge elements 144 to have turns as illustrated in FIG. 6.

Referring back to FIG. 2, the supporting substrate 140 may include the electrical traces 145 transmitting signals of the image sensor 111. Multiple bridge elements 144 included in the supporting portion 143 may each have one of the electrical traces 145 embedded therein or disposed thereon. The image sensor 111 may be mounted on the sensor substrate 112, and the sensor substrate 112 may be electrically connected to the movable portion 141 of the supporting substrate 140. The electrical traces 145 may extend from each of a plurality of contact points P4 formed on the movable portion 141. The electrical traces 145 may extend to the fixed portion 142 through the bridge elements 144. The electric traces 145 extending to the fixed portion 142 may be electrically connected to another substrate or an electronic component.

FIG. 2 schematically illustrates the electrical traces 145 formed on the supporting substrate 140, and illustrates only the electrical traces 145 extending from some of the contact points P4 for ease of illustration.

The bridge elements 144 may each have a width and a height. For example, the width may refer to a width in a direction orthogonal to a direction in which the bridge elements 144 extend on an X-Y plane. For example, a width of each of the bridge elements 144 of the first bridges 147 may refer to a width in the X-direction, and a width of each of the bridge elements 144 of the second bridges 148 may refer to a width in the Y-direction.

In addition, the height of each of the bridge elements 144 may refer to a height in an optical axis (Z-axis) direction.

The bridge elements 144 may each have a shape having a width less than a height. Such a shape may limit a direction in which the bridge elements 144 may be bent. For example, the bridge elements 144 of the first bridges 147 may be bent in a first direction (X-direction), and the bridge elements 144 of the second bridges 148 may be bent in a second direction (Y-direction).

FIGS. 3A to 3D are diagrams illustrating examples of a state in which the supporting substrate of FIG. 2 is deformed according to a movement of a moving body of FIG. 1.

As the moving body 110 is moved, a portion of the supporting substrate 140 may be moved together with the moving body 110. The portion of the supporting substrate 140 moving together with the image sensor 111 may change depending on a direction in which the moving body 110 is moved. For example, when the moving body 110 moves in one direction (for example, an X-direction), the movable portion 141 and the connection portion 146 of the supporting substrate 140 may be moved together with the moving body 110. In addition, when the moving body 110 moves in another direction (for example, a Y-direction), the movable portion 141 of the supporting substrate 140 may be moved together with the moving body 110.

Figure 3A:
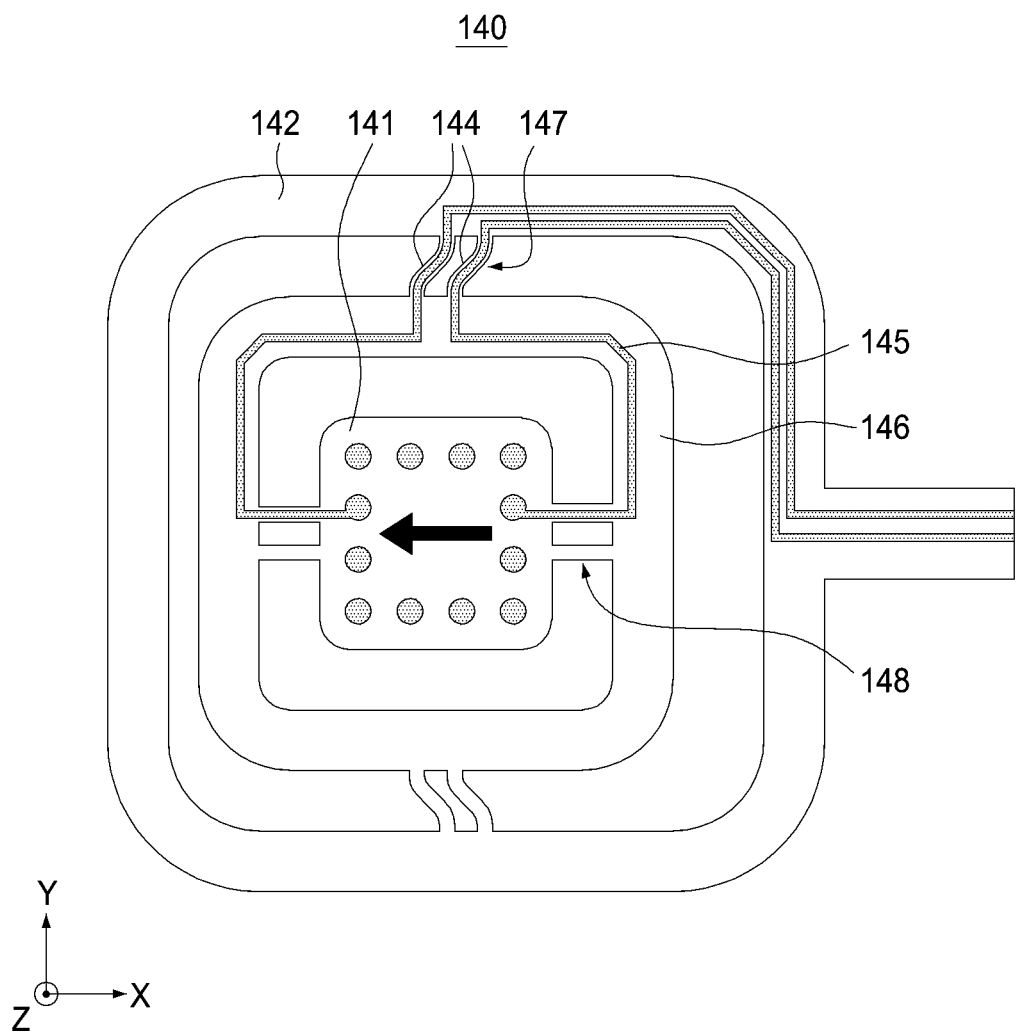
FIGS. 3A to 3D are diagrams illustrating examples of a state in which the supporting substrate of FIG. 2 is deformed according to a movement of a moving body of FIG. 1.

Referring to FIG. 3A, when the moving body 110 moves in a −X-direction, the movable portion 141 and the connection portion 146 of the supporting substrate 140 may also move in the -X-direction, and accordingly the first bridges 147 connecting the connection portion 146 and the fixed portion 142 to each other may be deformed. The bridge elements 144 included in the first bridges 147 may have an elasticity, and thus the deformed first bridges 147 may provide a restoring force to return the movable portion 141 in a direction (that is, a +X direction) opposite to the movement direction (that is, the −X-direction). Accordingly, when no current is applied to the driver 120, the movable portion 141 and the connection portion 146 may move in the +X-direction.

Figure 3B:
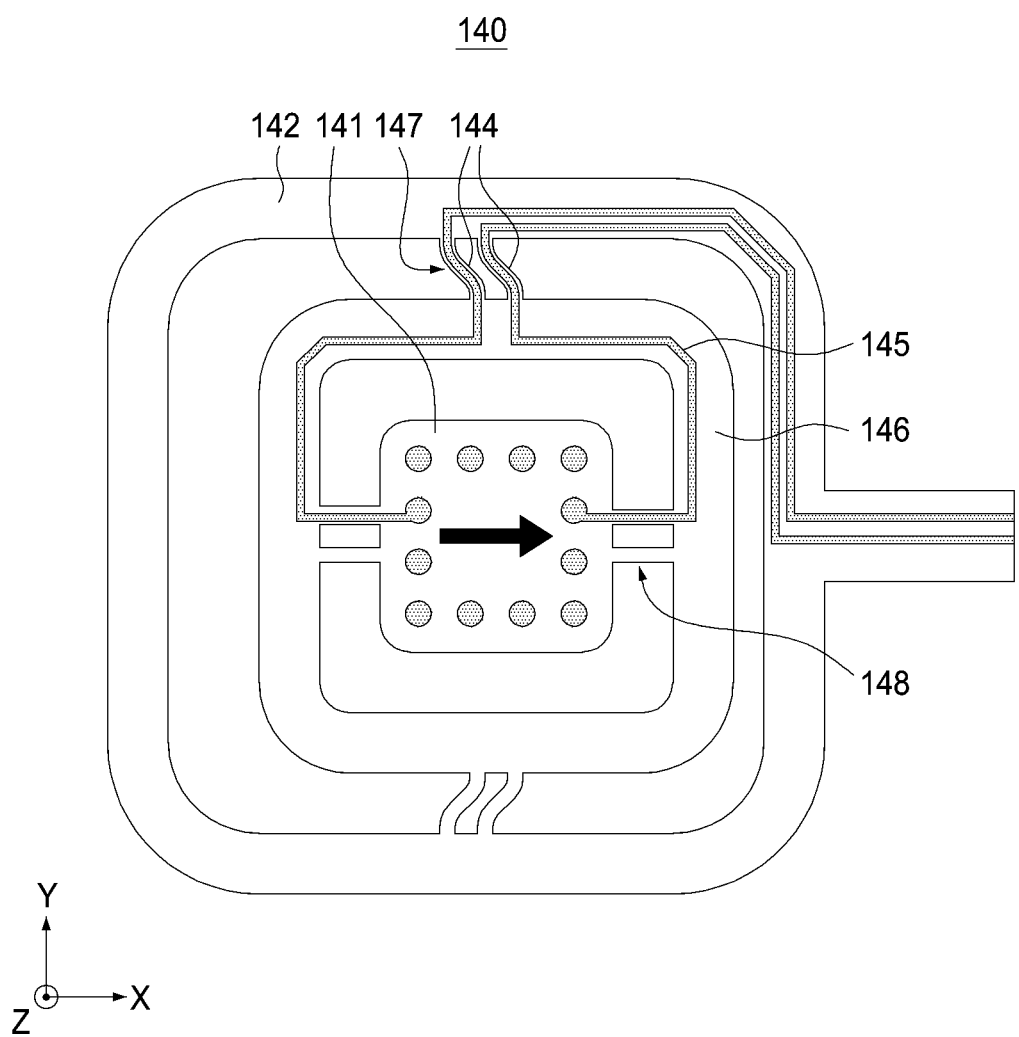

Referring to FIG. 3B, when the moving body 110 moves in the +X-direction, the movable portion 141 and the connection portion 146 of the supporting substrate 140 may also move in the +X-direction, and accordingly the first bridges 147 connecting the connection portion 146 and the fixed portion 142 to each other may be deformed. The bridge elements 144 included in the first bridges 147 may have an elasticity, and thus the deformed first bridges 147 may provide a restoring force to return the movable portion 141 in a direction (that is, a −X-direction) opposite to the movement direction (that is, the +X-direction). Accordingly, when no current is applied to the driver 120, the movable portion 141 and the connection portion 146 may move in the −X-direction.

Figure 3C:
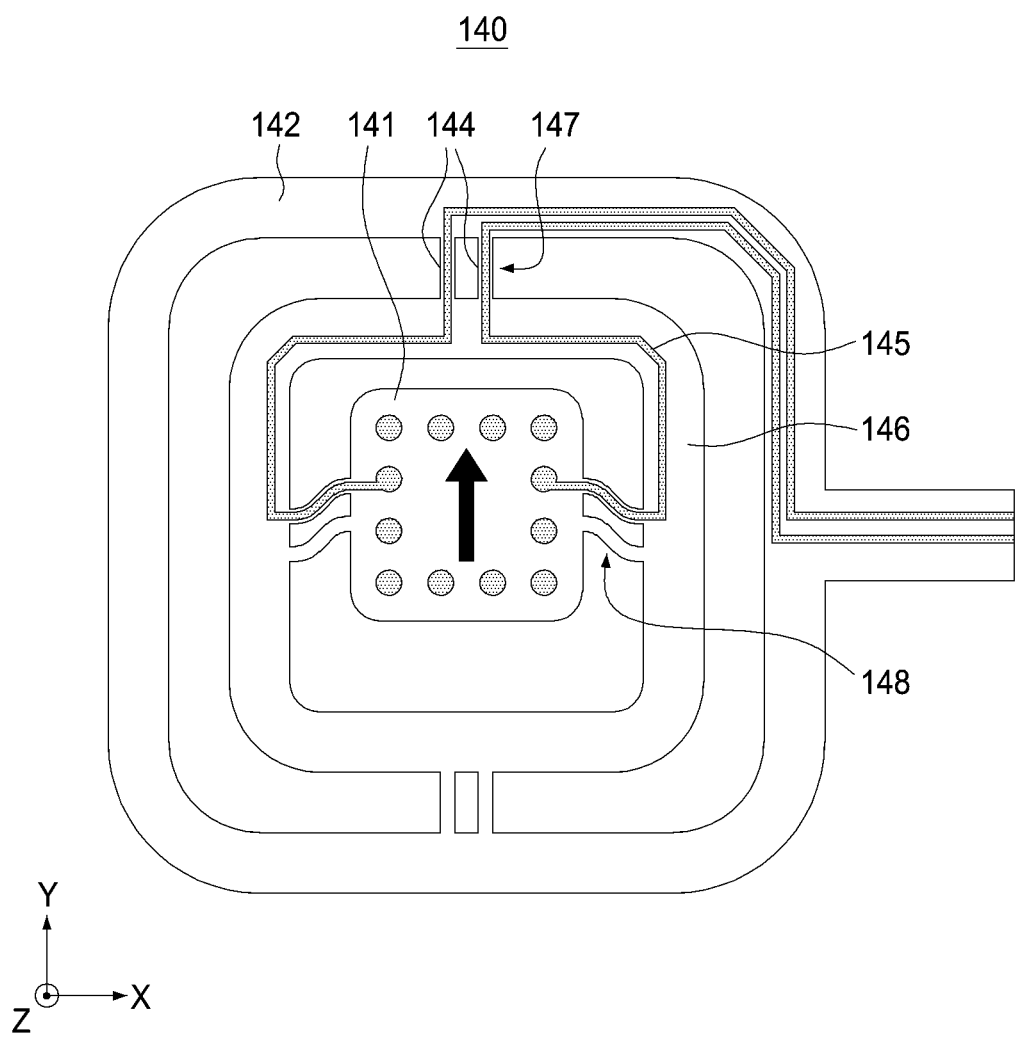

Referring to FIG. 3C, when the image sensor 111 moves in a +Y-direction, the movable portion 141 of the supporting substrate 140 may also move in the +Y-direction, and thus the second bridges 148 connecting the movable portion 141 and the connection portion 146 to each other may be deformed. The bridge elements 144 included in the second bridges 148 may have an elasticity, and thus the deformed second bridges 148 may provide a restoring force to return the movable portion 141 in a direction (that is, a −Y-direction) opposite to the movement direction (that is, the +Y-direction). Accordingly, when no current is applied to the driver 120, the movable portion 141 may move in the −Y-direction.

Figure 3D:
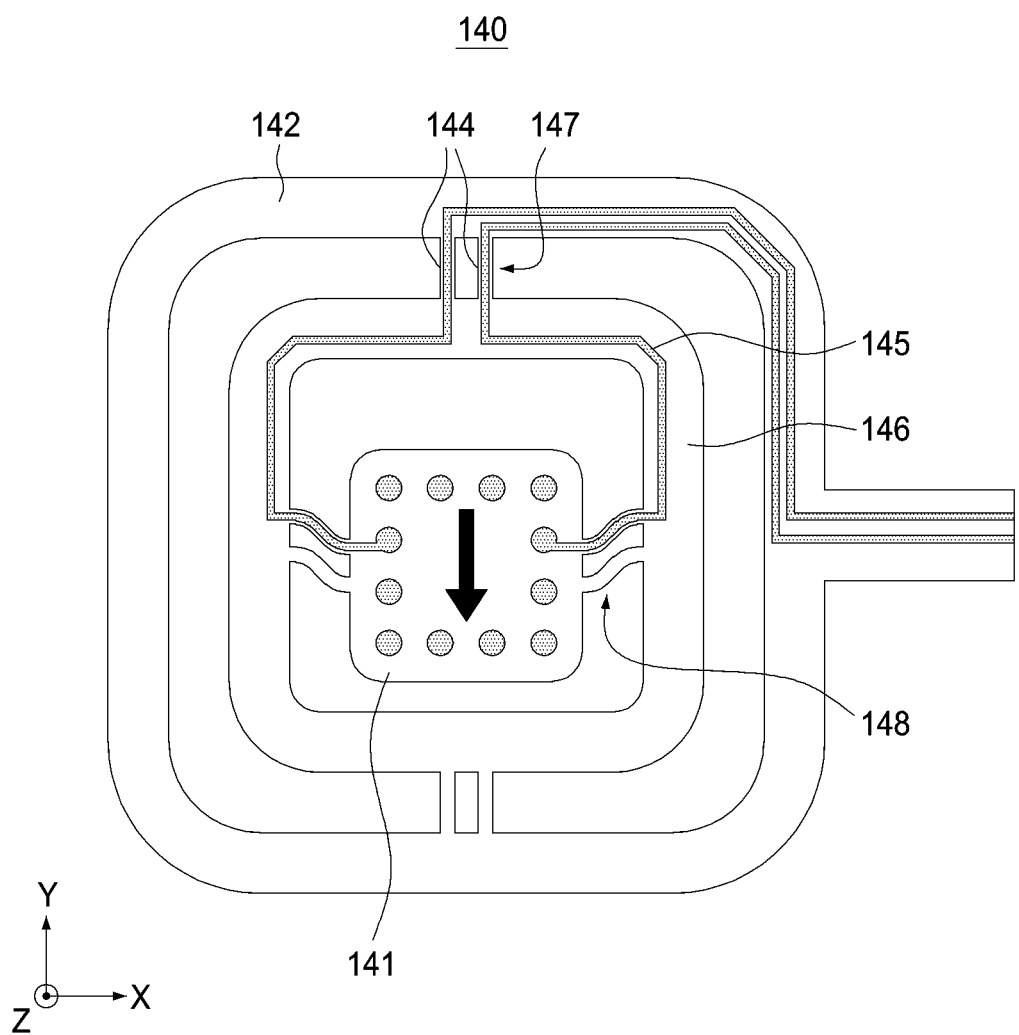

Referring to FIG. 3D, when the moving body 110 moves in the −Y-direction, the movable portion 141 of the supporting substrate 140 may also move in the −Y-direction, and thus the second bridges 148 connecting the movable portion 141 and the connection portion 146 to each other may be deformed. The bridge elements 144 included in the second bridges 148 may have an elasticity, and thus the deformed second bridges 148 may provide a restoring force to return the movable portion 141 in a direction (that is, the +Y-direction) opposite to the movement direction (that is, the −Y-direction). Accordingly, when no current is applied to the driver 120, the movable portion 141 may move in the +Y-direction.

In an example embodiment, the driver 120 may include a coil portion 123 coupled to one of the moving body 110 and the fixed body 130, and the magnet portion 121 coupled to the other one of the moving body 110 and the fixed body 130.

Referring to FIG. 1, in an example embodiment, the coil portion 123 may be coupled to the sensor substrate 112, and the magnet portion 121 may be coupled to the housing 131. The coil portion 123 and the magnet portion 121 may be disposed to oppose each other in the optical axis (Z-axis) direction. In the example embodiment illustrated in FIG. 1, the coil portion 123 may be a moving member moving together with the moving body 110, and the magnet portion 121 may be a fixed member fixed to the housing 131.

In an example embodiment, the coil portion 123 may include four coils 123a, 123b, 123c, and 123d disposed in an edge region of the sensor substrate 112 as shown in FIGS. 7A to 7D, and the magnet portion 121 may include four magnets (not shown) disposed on the housing 131 opposing the four coils 123a, 123b, 123c, and 123d in the optical axis (Z-axis) direction.

For example, the coil portion 123 may include a first coil 123a, a second coil 123b, a third coil 123c, and a fourth coil 123d, and the magnet portion 121 may include a first magnet, a second magnet, a third magnet, and a fourth magnet (the first to fourth magnets are not shown).

When viewed in the optical axis (Z-axis) direction, the coils 123a, 123b, 123c, and 123d and the four magnets may be disposed in a space between the connection portion 146 and the fixed portion 142 of the supporting substrate 140.

The coils 123a, 123b, 123c, and 123d each may be provided in the form of a winding coil and attached to the sensor substrate 112, but the present disclosure is not limited thereto, and the coils 123a, 123b, 123c, and 123d each may be a pattern coil implemented as a copper foil pattern stacked and embedded in the sensor substrate 112.

Figure 7A:
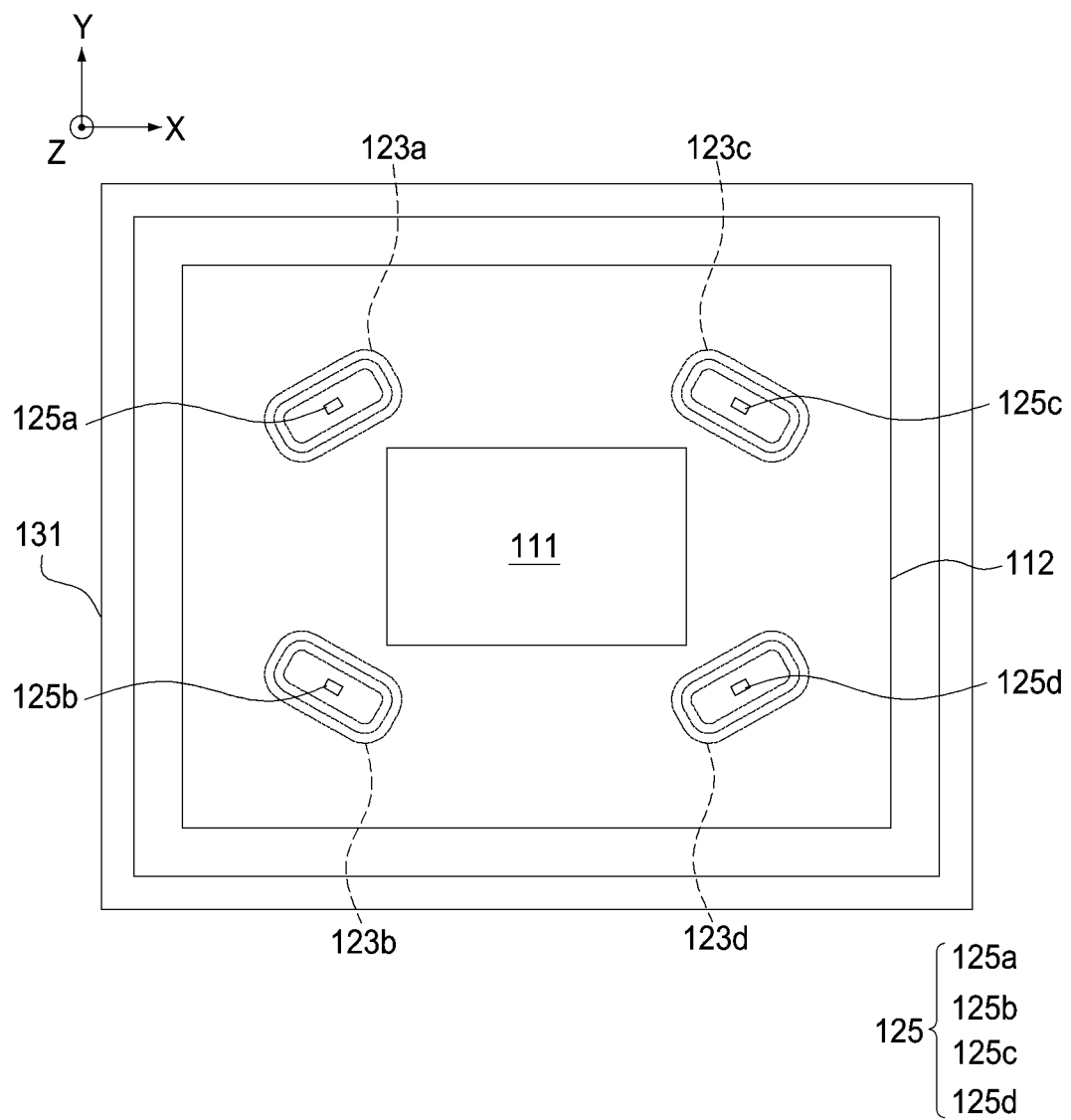
FIG. 7A is a diagram illustrating a state in which no driving force is generated by a driver of FIG. 1, and FIGS. 7B to 7D are diagrams illustrating examples of a direction of a driving force generated by the driver of FIG. 1.

FIG. 7A is a diagram illustrating a state in which no driving force is generated by a driver of FIG. 1, and FIGS. 7B to 7D are diagrams illustrating examples of a direction of a driving force generated by the driver of FIG. 1.

The moving body 110 may be moved in a direction orthogonal to the optical axis (Z-axis) with respect to the fixed body 130 by an electromagnetic force between the coil portion 123 and the magnet portion 121 of the driver 120 of FIG. 1. In addition, the moving body 110 may also be rotated in an X-Y plane with respect to the fixed body 130 by the electromagnetic force between the coil portion 123 and the magnet portion 121.

FIG. 7A is a diagram illustrating a state in which no driving force is generated by an electromagnetic force between the coil portion 123 and the magnet portion 121.

Figure 7B:
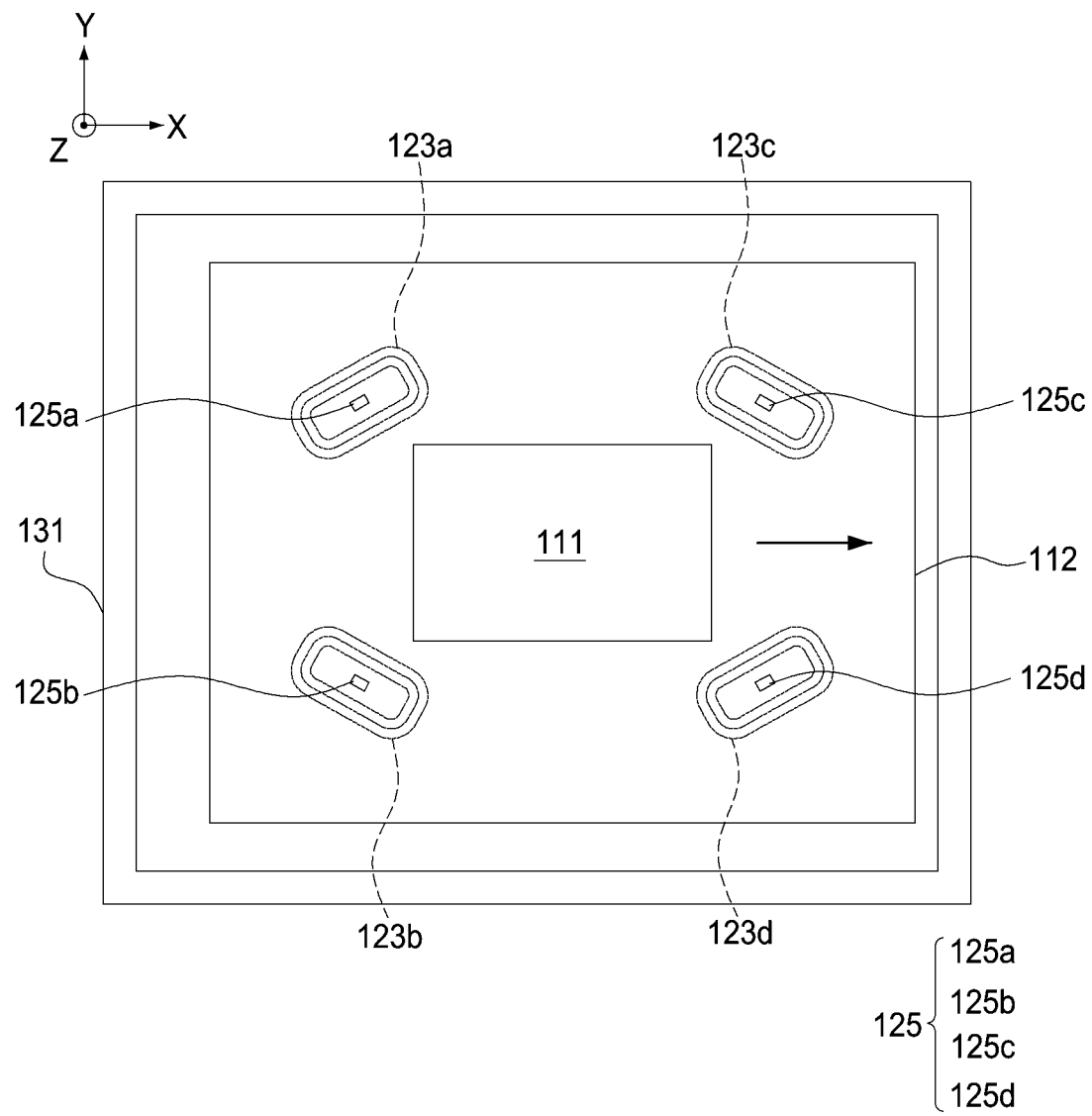
Figure 7C:
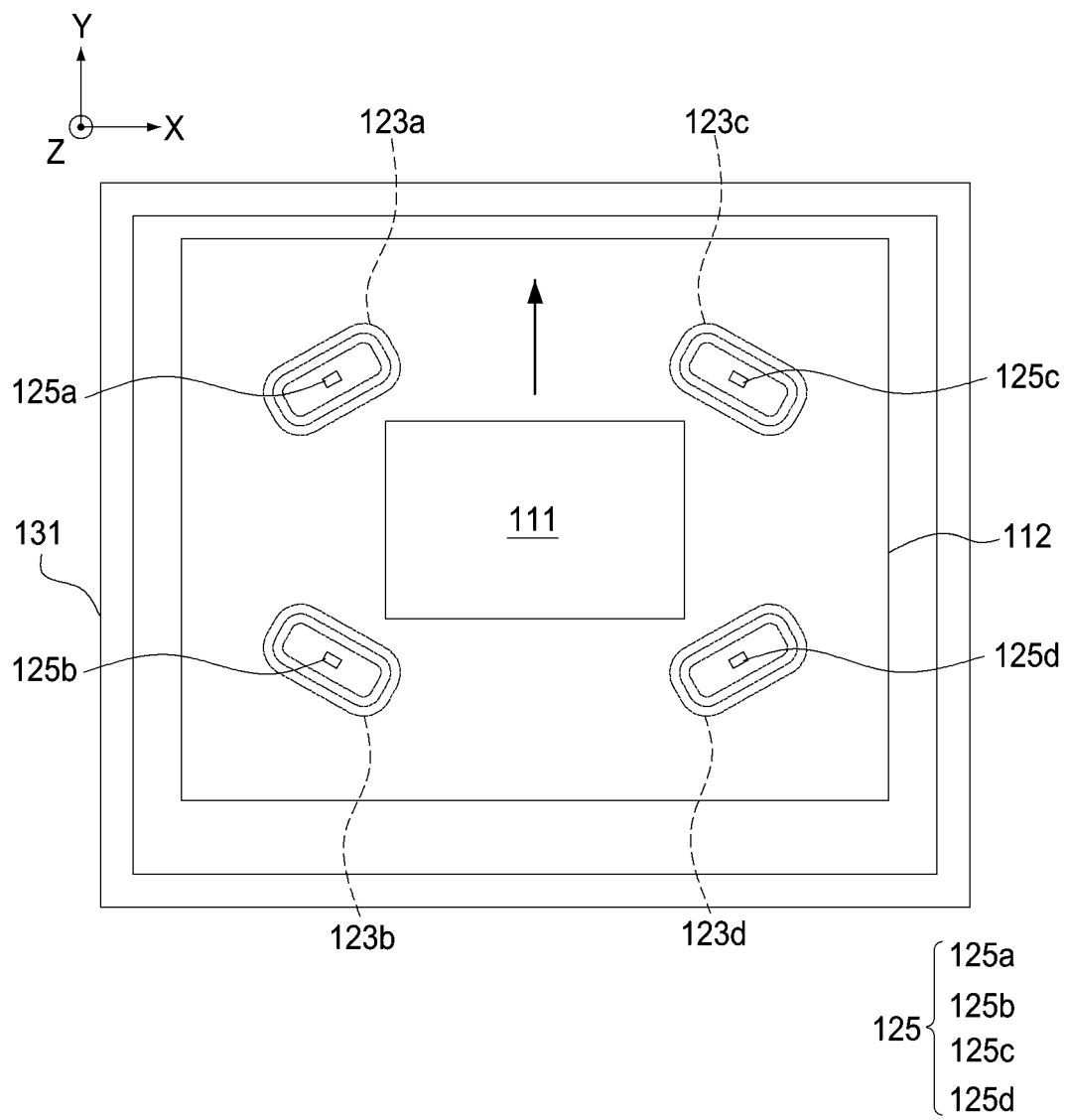
Figure 7D:
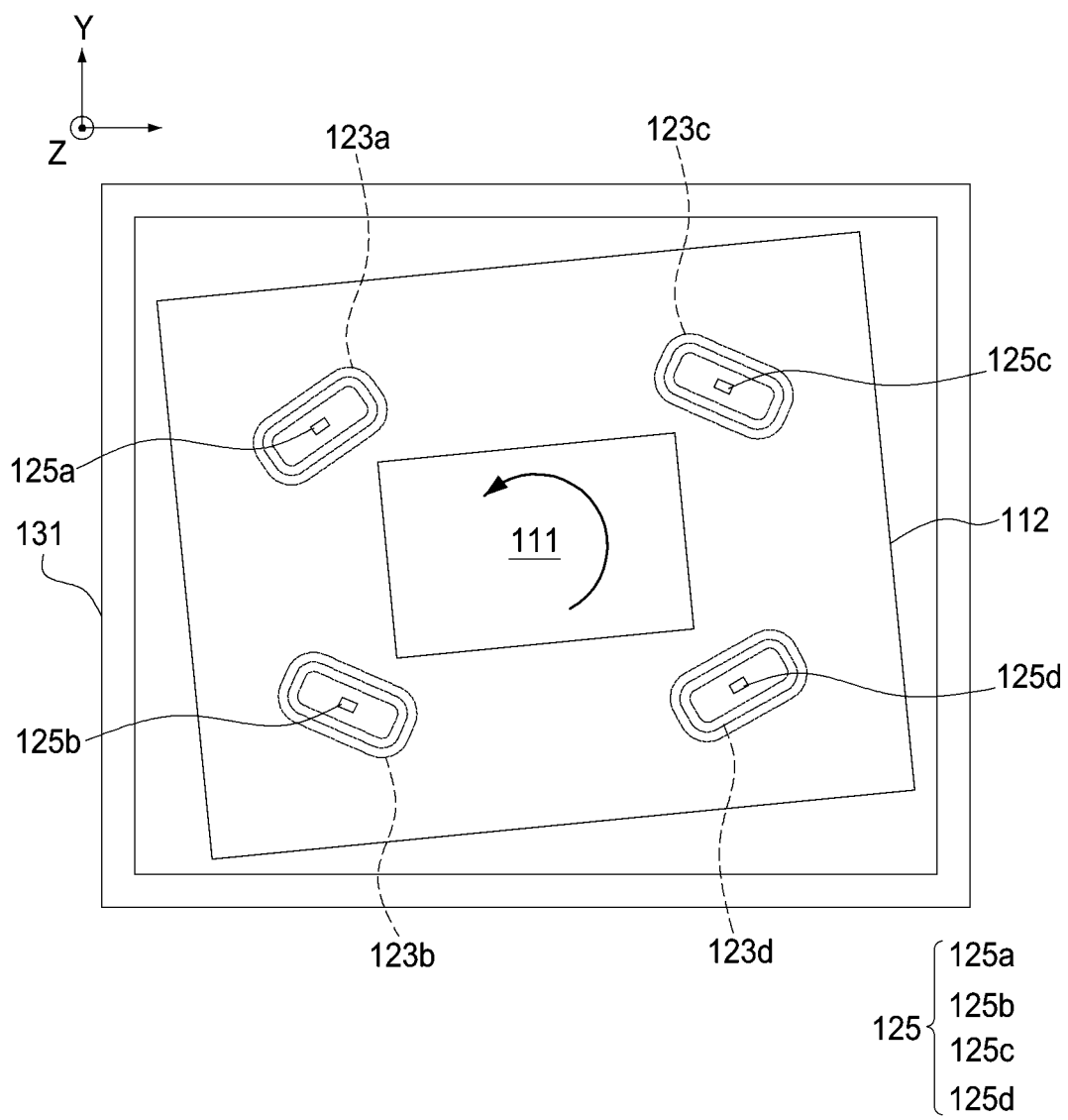

For example, as illustrated in FIGS. 7B to 7D, the electromagnetic force between the coil portion 123 and the magnet portion 121 may be adjusted. Accordingly, the moving body 110 may be moved in the X-direction as shown in FIG. 7B and/or the Y-direction as shown in FIG. 7C, and the moving body 110 may be rotated about the optical axis (Z-axis) as a rotation axis as shown in FIG. 7D.

For example, the moving body 110 may be moved in the X-direction as shown in FIG. 7B by a resultant force of a driving force of the first coil 123a and the first magnet, and a driving force of the second coil 123b and the second magnet.

Alternatively, the moving body 110 may be moved in the X-direction as shown in FIG. 7B by a resultant force of a driving force of the third coil 123c and the third magnet, and a driving force of the fourth coil 123d and the fourth magnet.

Alternatively, the moving body 110 may be moved in the X-direction as shown in FIG. 7B by a resultant force of the driving force of the first coil 123a and the first magnet, the driving force of the second coil 123b and the second magnet, the driving force of the third coil 123c and the third magnet, and the driving force of the fourth coil 123d and the fourth magnet.

In addition, the moving body 110 may be moved in the Y-direction as shown in FIG. 7C by a resultant force of the driving force of the first coil 123a and the first magnet, and the driving force of the third coil 123c and the third magnet.

Alternatively, the moving body 110 may be moved in the Y-direction as shown in FIG. 7C by a resultant force of the driving force of the second coil 123b and the second magnet, and the driving force of the fourth coil 123d and the fourth magnet.

Alternatively, the moving body 110 may be moved in the Y-direction as shown in FIG. 7C by a resultant force of the driving force of the first coil 123a and the first magnet, the driving force of the second coil 123b and the second magnet, the driving force of the third coil 123c and the third magnet, and the driving force of the fourth coil 123d and the fourth magnet.

In addition, the moving body 110 may be rotated about the Z-axis as shown in FIG. 7D by a resultant force of the driving force of the first coil 123a and the first magnet, and the driving force of the fourth coil 123d and the fourth magnet.

Alternatively, the moving body 110 may be rotated about the Z-axis as shown in FIG. 7D by a resultant force of the driving force of the second coil 123b and the second magnet, and the driving force of the third coil 123c and the third magnet.

Alternatively, the moving body 110 may be rotated about the Z-axis as shown in FIG. 7D by a resultant force of the driving force of the first coil 123a and the first magnet, the driving force of the second coil 123b and the second magnet, the driving force of the third coil 123c and the third magnet, and the driving force of the fourth coil 123d and the fourth magnet.

Referring to FIGS. 7A to 7D, the driver 120 may include a position sensor portion 125 capable of sensing a position of the moving body 110. The position sensor portion 125 may include a first position sensor 125a, a second position sensor 125b, a third position sensor 125c, and a fourth position sensor 125d.

The position sensor portion 125 may be disposed on the sensor substrate 112 to oppose the magnet portion 121. Each of the first position sensor 125a, the second position sensor 125b, the third position sensor 125c, and the fourth position sensor 125d may be a Hall sensor.

Figure 8:
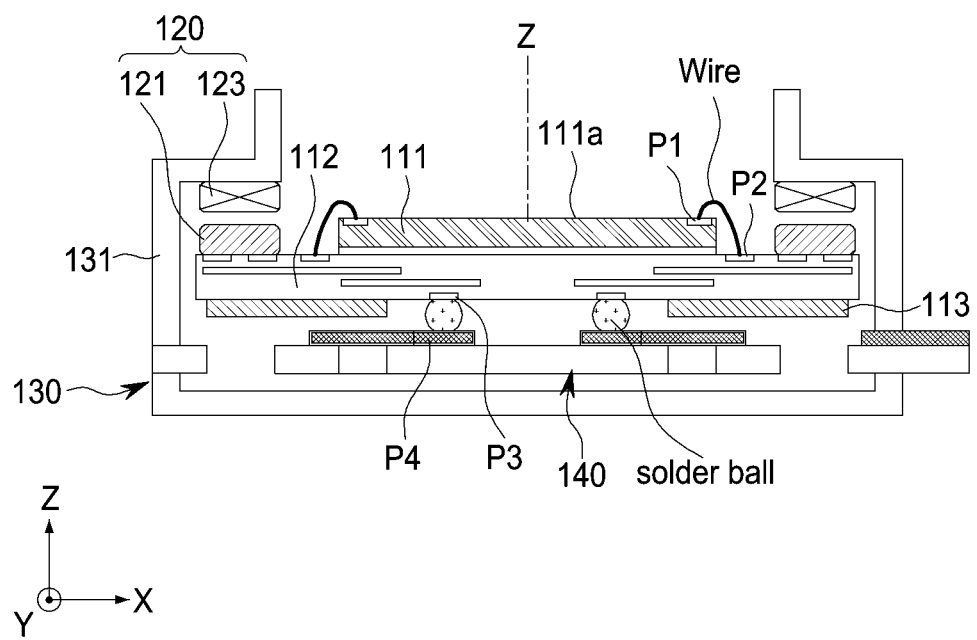
FIGS. 8 and 9 illustrate modifications of the driver of FIG. 1.
Figure 9:
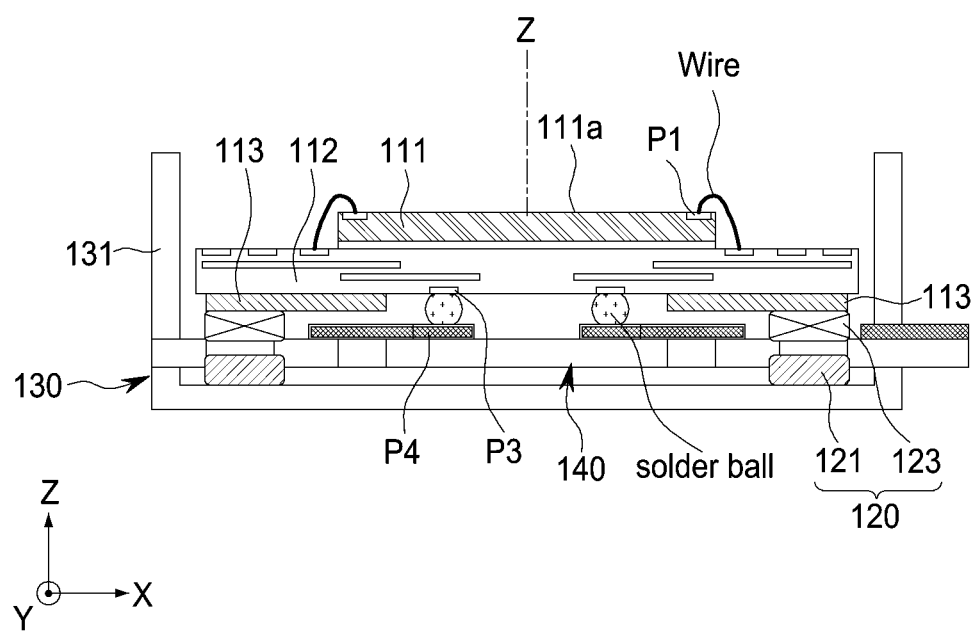

FIGS. 8 and 9 illustrate modifications of the driver of FIG. 1.

First, referring to FIG. 8, in a sensor shifting actuator 101, the coil portion 123 may be coupled to the housing 131, and the magnet portion 121 may be coupled to the sensor substrate 112. In this case, a substrate for applying power to the coil portion 123 may be disposed on the housing 131. In the example embodiment illustrated in FIG. 8, the magnet portion 121 may be a moving member moving together with the moving body 110, and the coil portion 123 may be a fixed member fixed to the housing 131.

Referring to FIG. 9, in a sensor shifting actuator 102, the coil portion 123 may be coupled to the sensor substrate 112, and the magnet portion 121 may be coupled to the housing 131. In the example embodiment of FIG. 1, the coil portion 123 may be disposed on an upper surface of the sensor substrate 112. In the example embodiment of FIG. 9, the coil portion 123 may be disposed on a lower surface of the sensor substrate 112.

FIG. 10 is a schematic cross-sectional view of a camera module according to an example embodiment of the present disclosure.

Referring to FIG. 10, a camera module 10 according to an example embodiment of the present disclosure may include a lens module 200 and the sensor shifting actuator 100 of FIG. 1. Alternatively, the camera module 10 may include the sensor shifting actuator 101 of FIG. 8, or the sensor shifting actuator 102 of FIG. 9.

At least one lens for imaging a subject may be disposed in the lens module 200. When a plurality of lenses are disposed in the lens module 200, the plurality of lenses may be mounted inside the lens module 200 along an optical axis (Z-axis).

The lens module 200 may have a hollow cylindrical shape to accommodate the at least one lens.

In another example embodiment, the lens module 200 may include a lens barrel and a lens holder. In this case, at least one lens may be disposed in the lens barrel, and the lens barrel may be coupled to the lens holder.

The lens module 200 may be disposed in a housing 300. In addition, the housing 300 may be coupled to the housing 131 of the sensor shifting actuator 100.

The image sensor 111 may be disposed in the sensor shifting actuator 100, and the image sensor 111 may be moved by the driver 120 in either one or both of a first direction (X-direction) and a second direction (Y-direction), or may be rotated about the optical axis (Z-axis).

Accordingly, a shake correction function may be performed by the movement of the image sensor 111 in either one or both of the first direction (X-direction) and the second direction (Y-direction), or the rotation of the image sensor 111 about the optical axis (Z-axis).

The camera module 10 according to an example embodiment of the present disclosure may perform shake correction by moving the image sensor 111 instead of the lens module 200. The image sensor 111 may be relatively light compared to the lens module 200, and thus the camera module 10 may move the image sensor 111 with a driving force that is smaller than a driving force needed to move the lens module 200. Accordingly, the camera module may be miniaturized.

In addition, the lens module 200 may be moved in an optical axis (Z-axis) direction with respect to the housing 300. Accordingly, a focus may be adjusted by a movement of the lens module 200 in the optical axis (Z-axis) direction.

A focus adjustment driver may include a magnet 210 and a coil 230 generating a driving force in the optical axis (Z-axis) direction. The magnet 210 may be attached to the lens module 200, and the coil 230 may be mounted on the housing 300 to oppose the magnet 210. A substrate for applying power to the coil 230 may be disposed in the housing 300. The coil 230 may be disposed on a surface of the substrate.

When power is applied to the coil 230, the lens module 200 may be moved in the optical axis (Z-axis) direction by an electromagnetic force between the magnet 210 and the coil 230.

When the lens module 200 is moved, a ball unit B may be disposed between the lens module 200 and the housing 300 to reduce friction between the lens module 200 and the housing 300. The ball unit B may include a plurality of balls.

A guide groove portion for accommodating the ball member B may be formed in either one or both of surfaces of the lens module 200 and the housing 300 opposing each other in a direction orthogonal to an optical axis (Z-axis).

The ball unit B may be accommodated in the guide groove portion so that it is disposed between the lens module 200 and the housing 300.

A yoke (not shown) may be disposed to oppose the magnet 210 in the direction orthogonal to the optical axis (Z-axis). As an example, the yoke may be disposed on the substrate on which the coil 230 is disposed. For example, the coil 230 may be disposed on one surface of the substrate, and the yoke may be disposed on another surface of the substrate on an opposite side of the substrate from the one surface of the substrate on which the coil 230 is disposed. Accordingly, the yoke may be disposed to oppose the magnet 210 with the coil 230 interposed therebetween.

An attractive force may act between the yoke and the magnet 210 in the direction orthogonal to the optical axis (Z-axis).

Accordingly, the ball unit B may be maintained in a contact state with the lens module 200 and the housing 300 by the attractive force between the yoke and the magnet 210.

In addition, a position sensor opposing the magnet 210 may be disposed on the substrate on which the coil 230 is disposed.

In FIG. 10, the ball unit B may be disposed on an opposite side of the lens module 200 from the magnet 210. However, such a configuration is for easy illustration of the ball unit B, and the ball unit B may be disposed at any position at which the contact state with the lens module 200 and the housing 300 may be maintained by the attractive force between the magnet 210 and the yoke.

FIG. 11 is a schematic cross-sectional view of a camera module according to another example embodiment of the present disclosure.

Referring to FIG. 11, a camera module 20 according to another example embodiment of the present disclosure may include the housing 300, a reflective module R, the lens module 200, and the sensor shifting actuator 100 of FIG. 1. Alternatively, the camera module 20 may include the sensor shifting actuator 101 of FIG. 8, or the sensor shifting actuator 102 of FIG. 9.

In the present example embodiment, an optical axis (Z-axis) of the lens module 200 may be a direction orthogonal to a thickness direction of a portable electronic device (a direction from a front surface to a rear surface of the portable electronic device or vice versa).

As an example, the optical axis (Z-axis) of the lens module 200 may be oriented in a width direction or a length direction of the portable electronic device.

When components included in the camera module are stacked in the thickness direction of the portable electronic device, a thickness of the portable electronic device may increase.

However, in the camera module 20 of the present example embodiment, the optical axis (Z-axis) of the lens module 200 may be oriented in the width direction or the length direction of the portable electronic device, thereby reducing the thickness of the portable electronic device.

The reflective module R and the lens module 200 may be disposed in the housing 300. However, it is also possible to dispose the reflective module R and the lens module 200 in separate housings, and to couple the respective housings to each other.

The reflective module R may be configured to change a travel direction of light. As an example, a travel direction of light incident into the housing 300 may be changed to be directed toward the lens module 200 by the reflective module R. The reflective module R may be a mirror or a prism capable of reflecting light.

The sensor shifting actuator 100 may be coupled to the housing 300.

The sensor shifting actuator 100 may be the sensor shifting actuator 100 according to an example embodiment of the present disclosure described above.

The image sensor 111 may be disposed in the sensor shifting actuator 100, and the image sensor 111 may be moved in either one or both of a first direction (X-direction) and a second direction (Y-direction), or may be rotated about the optical axis (Z-axis) as a rotation axis.

Accordingly, a shake correction function may be performed by the movement of the image sensor 111 in either one or both of the first direction (X-direction) and the second direction (Y-direction), or the rotation of the image sensor 111 about the optical axis (Z-axis).

In addition, the lens module 200 may be moved in an optical axis (Z-axis) direction with respect to the housing 300. Accordingly, a focus may be adjusted by the movement of the lens module 200 in the optical axis (Z-axis) direction.

A configuration of the focus adjustment driver may be the same as that of the focus adjustment driver 210 described with reference to FIG. 10, and thus a detailed description thereof will be omitted.

While this disclosure includes specific examples, it will be apparent after an understanding of the disclosure of this application that various changes in form and details may be made in these examples without departing from the scope and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor shifting actuator comprising:
a fixed body;
a moving body disposed in the fixed body and comprising an image sensor having an imaging surface, and a sensor substrate on which the image sensor is disposed;
a supporting substrate disposed in the fixed body and configured to support the moving body so that the moving body is movable with respect to the fixed body in a first direction and a second direction both parallel to the imaging surface of the image sensor; and
a driver configured to move the moving body in either one or both of the first direction and the second direction,
wherein the supporting substrate comprises a movable portion coupled to the moving body, a fixed portion coupled to the fixed body, and a connection portion disposed between the movable portion and the fixed portion,
wherein the movable portion and the connection portion are configured to be movable together in the first direction, and
wherein the movable portion is configured to be movable with respect to the connection portion in the second direction.

2. The sensor shifting actuator of claim 1, wherein the supporting substrate further comprises a first bridge connecting the fixed portion and the connection portion to each other in the second direction, and a second bridge connecting the movable portion and the connection portion to each other in the first direction, and
wherein the first direction and the second direction are orthogonal to each other.

3. The sensor shifting actuator of claim 2, wherein the first bridge and the second bridge each comprise a plurality of bridge elements, and
wherein each bridge element of the bridge elements has a length in a connection direction of the bridge element.

4. The sensor shifting actuator of claim 3, wherein each bridge element of the bridge elements has a width and a height, the width being less than the height, and
wherein the width of each bridge element is a width in a direction orthogonal to a length direction of the bridge element in a plane parallel to the imaging surface, and the height is a height in a direction orthogonal to the imaging surface.

5. The sensor shifting actuator of claim 3, wherein each bridge element of the bridge elements comprises a bridge part, and a trace part disposed at one end of the bridge part when viewing a cross-section of the bridge element in a length direction of the bridge element, and
wherein the trace part is configured to transmit a signal of the image sensor outside the sensor shifting actuator.

6. The sensor shifting actuator of claim 1, wherein the movable portion and the connection portion are configured to be movable together with the moving body in the first direction in response to the moving body being moved in the first direction, and
wherein the movable portion is configured to be movable together with the moving body in the second direction in response to the moving body being moved in the second direction.

7. The sensor shifting actuator of claim 1, wherein the driver comprises a magnet portion disposed on one of the moving body and the fixed body, and a coil portion disposed on a remaining one of the moving body and the fixed body, and
wherein the magnet portion and the coil portion oppose each other in a direction orthogonal to the imaging surface.

8. The sensor shifting actuator of claim 7, wherein the driver further comprises a position sensor opposing the magnet portion.

9. The sensor shifting actuator of claim 7, wherein the movable portion and the connection portion are spaced apart from each other in a plane parallel to the imaging surface,
wherein the fixed portion and the connection portion are spaced apart from each other in the plane parallel to the imaging surface, and
wherein the magnet portion and the coil portion are disposed between the fixed portion and the connection portion when viewed in the direction orthogonal to the imaging surface.

10. A camera module comprising:
a lens module comprising at least one lens;
a housing in which the lens module is disposed;
a driver configured to move the lens module in an optical axis direction of the lens module;
a fixed body coupled to the housing;
a moving body disposed in the fixed body and comprising an image sensor; and a supporting substrate configured to support the moving body so that the moving body is movable with respect to the fixed body in a first direction and a second direction both orthogonal to the optical axis direction,
wherein a first portion of the supporting substrate is configured to be movable together with the moving body in the first direction and the second direction, and
wherein a second portion of the supporting substrate is configured to be movable together with the first portion of the supporting substrate in the first direction or the second direction.

11. The sensor shifting actuator of claim 10, wherein the supporting substrate comprises a movable portion coupled to the moving body, a fixed portion coupled to the fixed body, and a connection portion disposed between the movable portion and the fixed portion,
wherein the movable portion is the first portion of the supporting substrate,
wherein the connection portion is the second portion of the supporting substrate,
wherein the movable portion and the connection portion are configured to be movable together with the moving body in the first direction in response to the moving body being moved in the first direction, and
wherein the movable portion is configured to be movable together with the moving body in the second direction in response to the moving body being moved in the second direction.

12. The sensor shifting actuator of claim 11, wherein the supporting substrate further comprises a first bridge connecting the fixed portion and the connection portion to each other in the second direction, and a second bridge connecting the movable portion and the connection portion to each other in the first direction, and
wherein the first bridge and the second bridge each comprise at least one electrical trace configured to transmit a signal of the image sensor outside the sensor shifting actuator.

13. The sensor shifting actuator of claim 12, wherein the first bridge and the second bridge each comprise a plurality of bridge elements,
wherein each bridge element of the bridge elements has a width, a height, and a length, the width being less than the height, and
wherein the width of each bridge element is a width in a direction orthogonal to a length direction of the bridge element in a plane orthogonal to the optical axis direction, and the height is a height in the optical axis direction.

14. The camera module of claim 10, further comprising a reflective module disposed in front of the lens module,
wherein the reflective module is configured to change a path of light incident on the reflective module so that the incident light is directed toward the lens module.

15. A sensor shifting actuator comprising:
a fixed body;
a supporting substrate disposed in the fixed body; and
a moving body disposed on the supporting substrate and comprising an image sensor having an imaging surface,
wherein the supporting substrate comprises:
    a movable portion on which the moving body is disposed;
    a connection portion surrounding the movable portion and spaced apart from the movable portion on all sides of the movable portion when viewed in a direction orthogonal to the imaging surface; and
    a fixed portion surrounding the connection portion and spaced apart from the connection portion on all sides of the connection portion when viewed in the direction orthogonal to the imaging surface
wherein the connection portion is configured to be movable together with the movable portion and the moving body with respect to the fixed portion in a first direction parallel to the imaging surface; and
the movable portion is configured to be movable together with the moving body with respect to both the connection portion and the fixed portion in a second direction parallel to the imaging surface and orthogonal to the first direction.

16. The sensor shifting actuator of claim 15, wherein the supporting substrate further comprises:
two first bridges respectively connecting two opposite sides of the connection portion to the fixed portion in the second direction; and
two second bridges respectively connecting two opposite sides of the movable portion to the connection portion in the first direction.

17. The sensor shifting actuator of claim 16, wherein the two first bridges are flexible in the first direction, and are not flexible in the second direction, and
wherein the two second bridges are flexible in the second direction, and are not flexible in the first direction.

18. The sensor shifting actuator of claim 16, wherein the movable portion, one of the two second bridge elements, the connection portion, one of the two first bridge elements, and the fixed portion each comprise a respective portion of a continuous electrical trace configured to transmit a signal of the image sensor outside the sensor shifting actuator.

19. The sensor shifting actuator of claim 15, further comprising a driver configured to move the moving body in the first direction and the second direction, and rotate the moving body about an optical axis of the imaging surface.

20. A sensor shifting actuator comprising:
a fixed body;
a supporting substrate disposed in the fixed body; and
a moving body disposed on the supporting substrate and comprising an image sensor having an imaging surface,
wherein the supporting substrate comprises:
    a fixed portion fixed to the fixed body;
    a connection portion flexibly supported by the fixed portion so that the connection portion is configured to be movable only in a first direction parallel to the imaging surface to perform shake correction; and
    a movable portion on which the moving body is disposed, the movable portion being flexibly supported by the connection portion so that the movable portion is configured to be movable together with the moving body and the connection portion in the first direction to perform the shake correction, and movable together with the moving body in a second direction parallel to the imaging surface and orthogonal to the first direction to perform the shake correction.

21. The sensor shifting actuator of claim 20, wherein the supporting substate further comprises:
two first bridges respectively connecting two opposite sides of the connection portion to the fixed portion in the second direction and being configured to bend only in the first direction; and
two second bridges respectively connecting two opposite sides of the movable portion to the connection portion in the first direction and being configured to bend only in the second direction.

22. The sensor shifting actuator of claim 20, further comprising a driver configured to move the moving body in the first direction and the second direction to perform the shake correction,
   wherein the driver comprises a magnet portion and a coil portion facing each other in a direction orthogonal to the imaging surface, and
   wherein either the magnet portion is disposed on the fixed housing and the coil portion is disposed on the moving body, or the magnet portion is disposed on the moving body and the coil portion is supported by the fixed housing.

23. The sensor shifting actuator of claim 22, wherein the driver is further configured to rotate the moving body about an optical axis of the image sensor to perform the shake correction.

* * * * *